United States Patent [19]

Plewes

[11] E Re. 31,180

[45] Reissued Mar. 15, 1983

[54] QUATERNARY SPINODAL COPPER ALLOYS

[75] Inventor: John T. Plewes, Berkeley Heights, N.J.

[73] Assignee: Bell Telephone Laboratories, Incorporated, Murray Hill, N.J.

[21] Appl. No.: 280,539

[22] Filed: Jul. 6, 1981

Related U.S. Patent Documents

Reissue of:

[64] Patent No.: 4,052,204
Issued: Oct. 4, 1977
Appl. No.: 685,263
Filed: May 11, 1976

[51] Int. Cl.[3] ..... C22C 9/02; C22C 9/06; C22F 1/08

[52] U.S. Cl. ..... 148/412; 148/414; 420/470; 420/473; 420/485

[58] Field of Search ..... 75/154, 159; 148/12.7 C, 32.5, 160

[56] References Cited

U.S. PATENT DOCUMENTS

| | | | |
|---|---|---|---|
| 1,535,542 | 4/1925 | Price | 75/154 |
| 1,816,509 | 7/1931 | Wise | 75/154 |
| 1,928,747 | 10/1933 | Wise | 148/32.5 |
| 3,676,226 | 7/1972 | Badia et al. | 75/159 |
| 3,824,135 | 7/1974 | Pryor et al. | 75/154 |
| 3,937,638 | 2/1976 | Plewes | 148/12.7 |
| 3,941,620 | 3/1976 | Pryor et al. | 148/12.7 C |
| 4,046,596 | 9/1977 | Metcalfe et al. | 148/2 |

FOREIGN PATENT DOCUMENTS

| | | |
|---|---|---|
| 09-5064 | of 1934 | Japan . |
| 39-19890 | of 1964 | Japan . |
| 48-37888 | of 1973 | Japan . |

OTHER PUBLICATIONS

Wise E., et al., *Strength and Aging of Nickel Bronzes,* in *Metals Tech,* Feb. 1964, pp. 218–244.

Fetz; E., *Bronzen Auf Kupfer-Nickel-Zinn Basis,* in *Zeit. fur Met.,* vol. 28, May 1936, pp. 350–353.

Patton, A., *Thickness v. Mechanical Properties of CU—Ni—Sn Alloy,* in *Brit. Found,* Mar. 1962, pp. 129–135.

*Primary Examiner*—Peter K. Skiff
*Attorney, Agent, or Firm*—Peter A. Businger

[57] ABSTRACT

Copper alloys are disclosed which contain nickel and tin and Fe, Zn, Mn, Zr, Nb, Cr, Al, or Mg in amounts within specified limits. When cold worked and aged according to a critical schedule these alloys develop a predominantly spinodal structure which renders them strong as well as ductile. The disclosed alloys are useful, for example, in the manufacture of components of electrical apparatus such as springs, connectors and relay elements.

5 Claims, No Drawings

QUATERNARY SPINODAL COPPER ALLOYS

Matter enclosed in heavy brackets [ ] appears in the original patent but forms no part of this reissue specification; matter printed in italics indicates the additions made by reissue.

BACKGROUND OF THE INVENTION

1. Field of the Invention

The invention is concerned with spinodal alloys.

2. Description of the Prior Art

Spinodal copper-nickel-tin alloys have been developed recently as commercially viable substitutes for copper-beryllium and phosphor-bronze alloys currently prevalent in the manufacture of articles such as electrical wire, springs, connectors, and relay elements. U.S. Pat. No. 3,937,638, issued to J. T. Plewes on Feb. 10, 1976, (Case 2) and assigned to the assignee hereof, discloses copper-nickel-tin alloys which, when cold worked and aged according to a critical schedule, exhibit unexpectedly high levels of yield strength in combination with high levels of ductility. For example, a copper-nickel-tin alloy containing 9% nickel, 6% tin, and remainder copper, when homogenized, cold worked by an amount corresponding to an area reduction of 99%, and aged for 75 minutes at a temperature of 300° C., exhibits a yield strength of 182,000 pounds per square inch and undergoes 52% reduction in cross-sectional area under tension before failure.

The composition of these alloys is characterized in that such alloys are in a single phase state at temperatures near the melting point of the alloy but in a two-phase state at room temperature; the spinodal structure is characterized in that, at room temperature, the second phase is finely dispersed throughout the first phase rather than being situated at the first phase grain boundaries.

The treatment which develops the spinodal grain structure in preference to an undesirable second phase precipitation at the grain boundaries calls for homogenizing, cold working and aging the alloy. Specifically, the aging temperature is required to be in the vicinity of an optimal temperature $T_d$ dependent primarily on the amount of cold work performed but must not exceed the so-called reversion temperature $T_m$ which is dependent primarily upon the composition of the alloy. Table I taken from U.S. Pat. No. 3,937,638, shows reversion temperatures for a number of copper-nickel-tin alloys which develop a spinodal structure when properly cold worked and aged.

SUMMARY OF THE INVENTION

It has been discovered that the predominantly spinodal two-phase structure obtained in certain copper-nickel-tin alloys by an appropriate cold working and aging treatment is essentially retained in the presence of significant amounts of Fe, Zn, Mn, Zr, Nb, Cr, Al, or Mg. The addition of such fourth elements is of interest for reasons such as cost reduction, facilitating hot working, increasing ductility or strength, and lowering the amount of cold work required for achieving the spinodal structure.

DETAILED DESCRIPTION

Copper-nickel-tin alloys of a composition containing from 2–20% nickel, from 2–8% tin, and remainder copper have been found to develop an essentially spinodal structure even when certain fourth elements are substituted for corresponding amounts of copper.

While a neutral effect on alloy properties might have reasonably been foreseen if amounts of up to 2% by weight of Fe, Zn, or Mn were present in the alloy, it has been ascertained that these elements may actually be present in amounts in excess of 2% and that even amounts significantly in excess of 5% can be tolerated. Specifically, amounts of Fe of up to 15%, of Zn of up to 10%, or of Mn of up to 15% can replace corresponding amounts of copper in the interest of reducing the cost of the alloy. If more than one of the elements Fe, Zn and Mn is present in the alloy, their combined amount should preferably not exceed 15% by weight. While replacing copper with Zn or Mn does not significantly change the mechanical properties of the worked and aged alloy, replacing copper with iron has, aside from cost reduction, the additional beneficial effect of increasing formability. Conversely, in the presence of iron smaller amounts of cold work are sufficient to achieve a desired level of ductility as compared with the amount required for the corresponding basic copper-nickel-tin alloy.

In contrast to the relatively large amounts of iron, zinc or manganese which may beneficially replace copper in spinodal alloys relatively small amounts of the elements Zr, Nb, Cr, Al or Mg are recommended. Specifically, Zr added in an amount of from 0.05 to 0.2% by weight prevents surface cracking and alligatoring during hot working of the cast ingot. The presence of Nb in an amount of from 0.1 to 0.3% or Cr in an amount of from 0.5 to 1.0% by weight, enhances ductility of the worked alloy. The presence of Mg in an amount of from 0.5 to 1.0% or Al in an amount of from 0.5 to 1.5% by weight leads to an alloy whose properties correspond to those of copper-nickel-tin alloys of significantly greater tin content. Since the price of Al or Mg is a fraction of that of tin, considerable savings can be achieved by their use. If present in combination the total amount of the elements Zr, Nb, Cr, Al, and Mg should peferably not exceed 1.5% and, if present in combination with Fe, Zn, or Mn, the total amount of elements other than Cu, Ni, and Sn should preferably not exceed 15% by weight.

The effects of the presence of fourth elements were experimentally investigated at various levels of cold work and corresponding aging temperatures. To exemplify such effects, Table II shows mechanical properties of a reference alloy and of four alloys which differ from the reference alloy in that an amount of a fourth element replaces a corresponding amount of copper. The reference alloy contains 9% nickel, 6% tin and remainder copper; the reference alloy as well as the four quaternary alloys were cold worked by an amount corresponding to a 35% reduction in area and aged for 20 hours at a temperarture of 350° C. Shown are, for each alloy, the elastic limit under tension, the area reduction on fracture under tension and the smallest bend radius achievable without fracture. It can be seen from Table II that the quaternary alloys, when compared to the reference alloy, have superior ductility and formability as measured by area reduction and bend radius, respectively, and that the strength of these alloys is comparable or superior to that of the reference alloy.

A second group of examples is shown in Table III. Here too, the reference alloy contains 9% nickel, 6% tin, and remainder copper; however, the reference alloy of Table III as well as the quaternary alloys of examples 5-9 were cold worked by an amount of 99% reduction in area and aged for 10 minutes at 350° C. It can be seen from Table III that, except for the alloy containing Al, the quaternary alloys have properties comparable to those of the reference alloy. While the aluminum alloy is less ductile that the reference alloy, its high strength combined with adequate ductility is indicative of a spinodal structure.

TABLE I

| Composition (wt. % Ni, Wt. % Sn, Rom. Cu) | | Reversion Temp ($T_m$) (±5° C.) |
|---|---|---|
| 3½% Ni | 2½% Sn | 401° C. |
| 5% Ni | 5% Sn | 458° C. |
| 7% Ni | 8% Sn | 502° C. |
| 9% Ni | 6% Sn | 508° C. |
| 10½% Ni | 4½% Sn | 530° C. |
| 12% Ni | 8% Sn | 555° C. |

TABLE II

| | 4th Element | Elastic Limit | Area Reduction On Fracture | Bend |
|---|---|---|---|---|
| Reference | — | 131,000 psi | 6% | 15t |
| Ex. 1 | 9% Fe | 131,000 | 52% | 1t |
| Ex. 2 | 0.2% Nb | 144,000 | 41% | 2t |
| Ex. 3 | 0.7% Cr | 128,000 | 50% | 1t |
| Ex. 4 | 1.5% Mg | 151,000 | 57% | 2t |

TABLE III

| | 4th Element | Elastic Limit | Area Reduction On Fracture | Bend |
|---|---|---|---|---|
| Reference | — | 167,000 psi | 50% | 2t |
| Ex. 5 | 5% Zn | 160,000 | 55% | 1t |
| Ex. 6 | 9% Mn | 183,000 | 42% | 1t |
| Ex. 7 | 1% Mg | 191,000 | 57% | 2t |
| Ex. 8 | 1% Al | 210,000 | 8% | 20t |
| Ex. 9 | .15% Zr | 183,000 | 40% | 4t |

What is claimed is:

1. Cold worked and aged spinodal copper alloys consisting essentially of nickel in an amount of from 2-20%, tin in an amount of from 2-8%, an additional element selected from the group consisting of Fe in an amount of from 2 to 15% [, Zn in an amount of from 2 to 10%,] and Mn in an amount of from 2 to 15%, and remainder copper.

2. Copper alloys of claim 1 and containing at least 5% of an element selected from said group.

3. Copper alloys of claim 1 containing at least two elements selected from said group in a combined amount of at most 15%.

4. Cold-worked and aged spinodal copper alloys consisting essentially of nickel in an amount of from 2-20%, tin in an amount of from 2-8%, at least one additional element selected from the group consisting of Zr in an amount of from 0.05-0.2%, Nb in an amount of from 0.1-0.3%, Cr in an amount of from 0.5-1%, Al in an amount of from 0.5-1.5%, and Mg in an amount of from 0.5-1%, and remainder copper.

5. Copper alloys of claim 4 containing at least two elements selected from said group in a combined amount of at most 1.5%.

* * * * *